(12) United States Patent
Geiger et al.

(10) Patent No.: US 7,064,293 B2
(45) Date of Patent: Jun. 20, 2006

(54) HEATING ELEMENT FOR PREHEATING INTAKE AIR FOR AN INTERNAL COMBUSTION ENGINE

(75) Inventors: Steffen Geiger, Asperg (DE); Thomas Giffels, Stuttgart (DE); Martin Eller, Ludwigsburg (DE); Ullrich Stephan, Erligheim (DE); Hans Houben, Wuerselen (DE)

(73) Assignee: Beru AG, Ludwigsburg (DE)

( * ) Notice: Subject to any disclaimer, the term of this patent is extended or adjusted under 35 U.S.C. 154(b) by 0 days.

(21) Appl. No.: 11/043,035

(22) Filed: Jan. 27, 2005

(65) Prior Publication Data

US 2005/0167411 A1    Aug. 4, 2005

(30) Foreign Application Priority Data

Jan. 29, 2004    (DE) ................. 10 2004 004 551

(51) Int. Cl.
*B60L 1/02*    (2006.01)

(52) U.S. Cl. ................. 219/205; 219/206; 219/207; 123/549; 123/556

(58) Field of Classification Search ........ 219/205–207; 123/549, 556
See application file for complete search history.

(56) References Cited

U.S. PATENT DOCUMENTS 6,119,665 A * 9/2000 Anderson et al. ........... 123/549
6,651,632 B1 * 11/2003 Thimmesch et al. ........ 123/549

FOREIGN PATENT DOCUMENTS

DE    195 15 533 A1    11/1996

* cited by examiner

*Primary Examiner*—Shawntina Fuqua
(74) *Attorney, Agent, or Firm*—David S. Safran

(57) ABSTRACT

A heating element for preheating intake air for an internal combustion engine and having a housing for attaching the heating element to an air intake line of the internal combustion engine. At least one heating strip (1), which runs in windings (1*a*), is held in the housing and is provided with electrical terminals (6) that lead from the housing to the outside. The heating strip (1) is held in the housing by a support (3) running between two housing walls, which runs, electrically insulated, through the windings (1*a*) of the heating strip (1).

14 Claims, 4 Drawing Sheets

HEATING ELEMENT FOR PREHEATING INTAKE AIR FOR AN INTERNAL COMBUSTION ENGINE

BACKGROUND OF THE INVENTION

1. Field of Invention

The present invention relates to a heating element for preheating intake air for an internal combustion engine, having a housing for attaching the heating element to an air intake line of the internal combustion engine and at least one heating strip running in windings, which is held in the housing and is provided with electrical terminals that run from the housing to the outside.

2. Description of Related Art

A heating element of this type is known, for example, from U.S. Pat. No. 6,119,665 or German Patent DE 195 15 533 C2.

It is considered disadvantageous in the known heating elements that wear may arise due to oscillations between the heating strip and the ceramic support provided for it.

SUMMARY OF THE INVENTION

The present invention is thus based on the object of providing a heating element of the above-mentioned type which is less susceptible to wear.

This object is achieved according to the present invention by the provision of a support, running between two housing walls and through the windings of the heating strip, and which is insulated in relation to the heating strip.

The ceramic support, which is provided in known heating elements and is used for the purpose of holding and supporting the heating strip, is dispensed with in the heating element according to the present invention, so that the wear arising there because of oscillations is avoided.

In addition, the heating element according to the present invention has the advantage that, because of the lack of the ceramic support and the devices provided for holding the ceramic support on the housing, the number of components of the heating element is reduced.

In the following, especially preferred exemplary embodiments of the heating element according to the present invention are described in greater detail on the basis of the accompanying drawings.

DETAILED DESCRIPTION OF THE INVENTION

Figure 1:
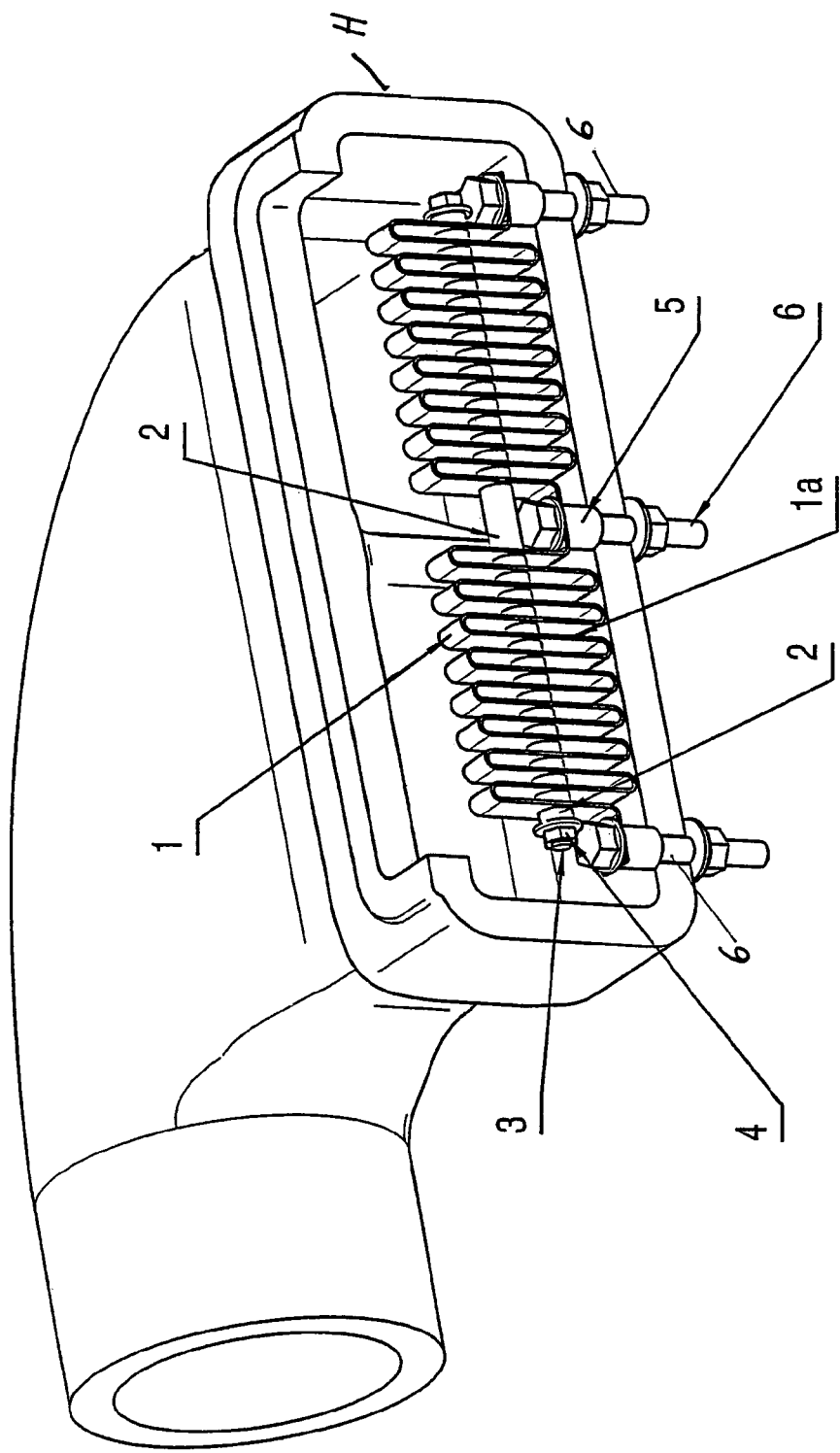
FIG. 1 is a perspective view of an exemplary embodiment of the heating element according to the present invention having a heating strip with a support and electrical terminals in the installed state.

FIG. 1 shows a heating element, installed in the air intake line of an internal combustion engine, having a one-piece heating strip 1 according to an exemplary embodiment of the present invention. The heating strip 1 is positioned in a housing H which is attached to the air intake line of the internal combustion engine.

The heating strip 1 is provided with serpentine windings 1a, or can run in a Greek key shape (not shown), and is provided with electrical terminals 6, which extend through insulators 5 from the housing H to the outside.

The heating strip 1 is mechanically attached to the housing H via the external electrical terminals 6. The central terminal 6 may also be provided for mechanical attachment of the heating strip 1 or as a central electrical tap.

A support 3, in the form of a support rod, for example, which is attached via a support fastener 4 to the terminals 6, is provided to support the heating strip 1.

As shown in FIG. 1, the support runs through the individual windings 1a of the heating strip 1, i.e., through the holes provided in the individual windings 1a. Spacers 2 are provided on the support 3 between the individual windings 1a in the form of rings, tablets, or beads, which are made of an insulating material.

The support 3 may be made of an insulating material or be provided with an insulating coating. However, an additional insulating tube (not shown) may be provided for the insulation between the heating strip 1 and the support 3, the support 3 able to be made of a non-insulating material in this case.

In the exemplary embodiment shown in FIG. 1, the spacers comprise rings which lie flat on the windings 1a of the heating strip 1 around the holes provided therein for the passage of the support 3.

The spacers 2 may be provided with axial extensions, rings, or lugs, which engage in recesses, particularly holes, in the windings 1a of the heating strip 1 and thus insulate the support 3 from the heating strip 1. In this case as well, the support 3 may be made of a non-insulating material.

Figure 4A:
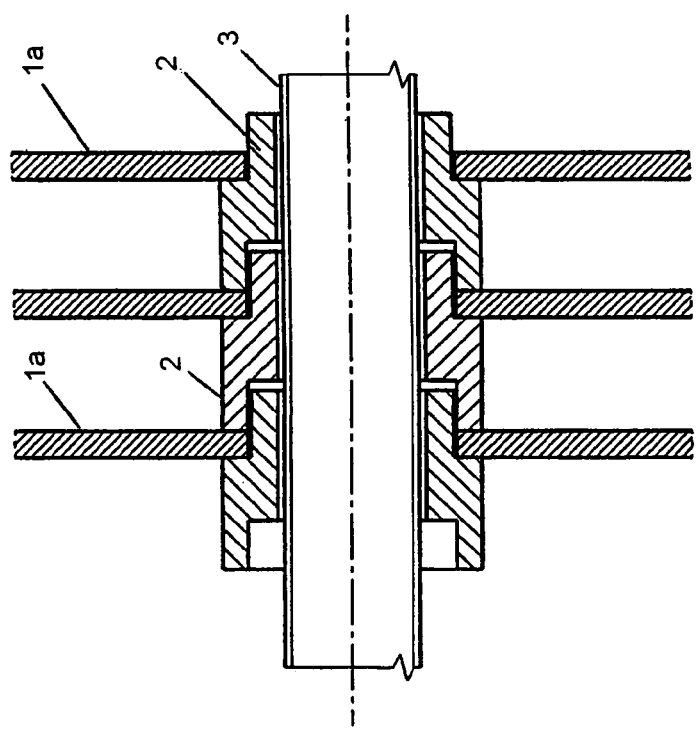
FIGS. 4A & 4B are sectional views of two embodiments of spacers that are located between the windings of the heating strip.
Figure 4B:
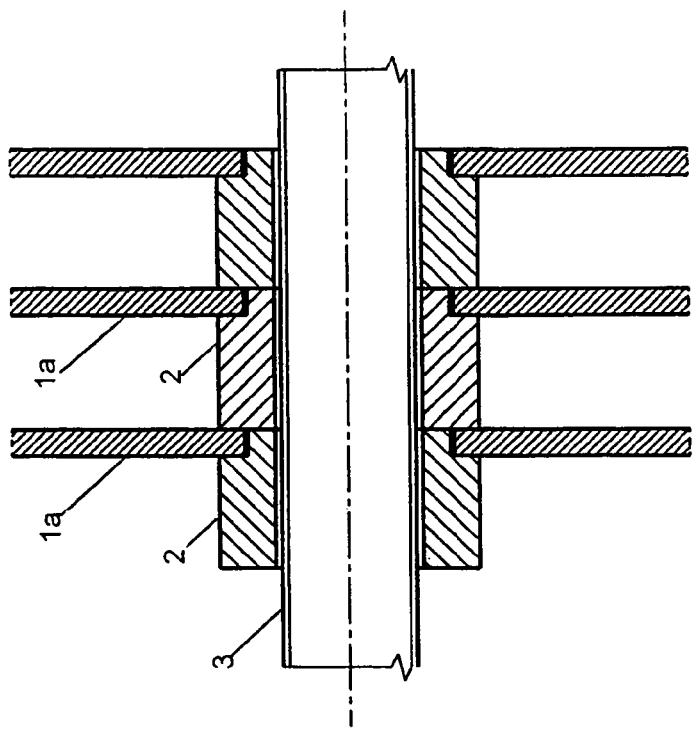

The exemplary embodiment shown in FIG. 4A shows spacers 2 which are implemented as sleeve-shaped with axial annular extensions on both sides. The axial annular extensions engage in recesses in the windings 1a of the heating strip 1 and in the axial annular extension of the neighboring spacer 2. FIG. 4B shows an exemplary embodiment of the spacer 2 which is also sleeve-shaped with an axial annular extension on one side that engages in a recess in the winding 1a of the heating strip 1. The face of this axial annular extension presses against the back of the neighboring spacer 2, but does not engage in it.

The individual windings 1a of the heating strip 1 may be screwed, riveted, clamped, or held in another way by the support 3 and the support fastener 4.

Figure 2:
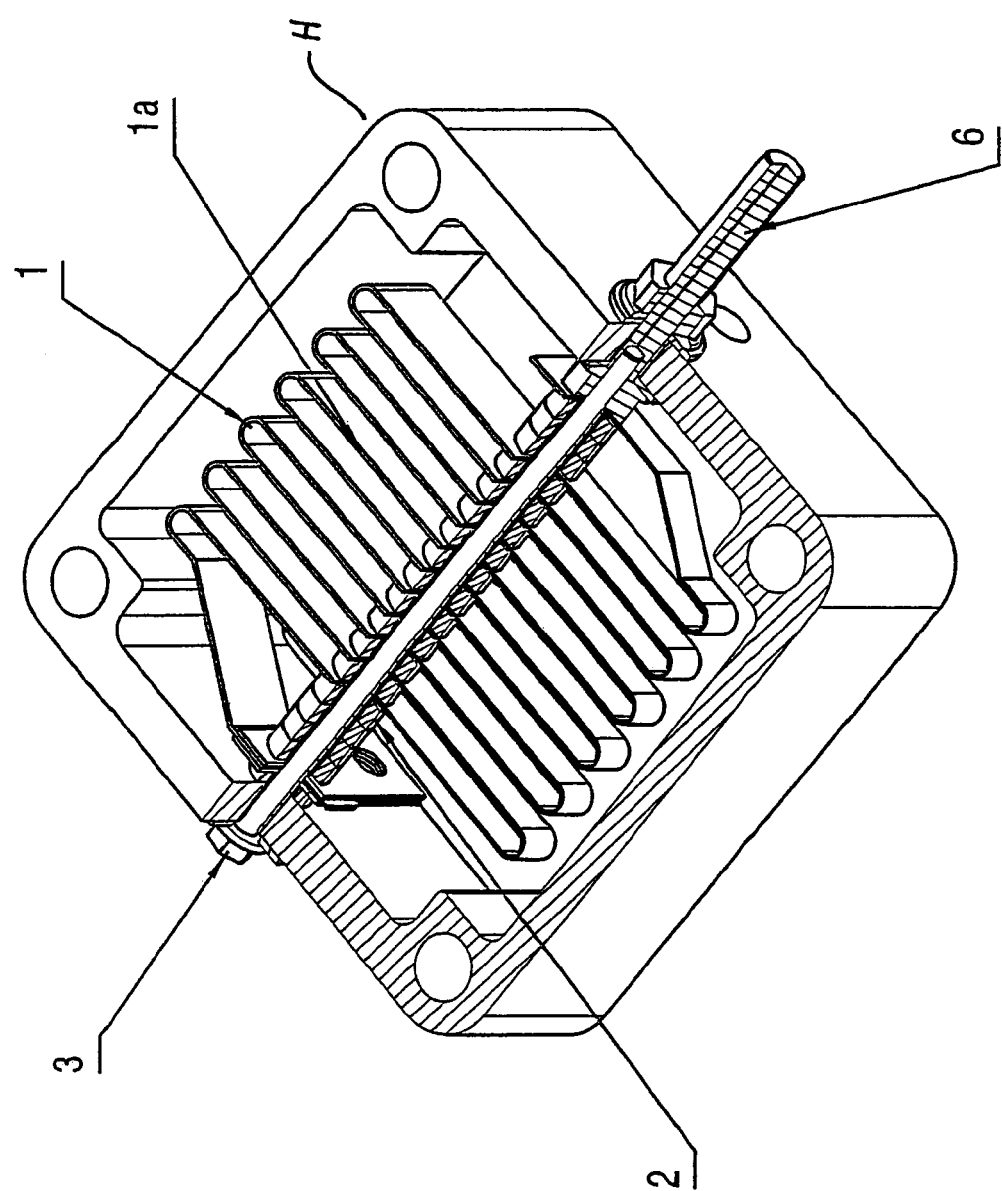
FIG. 2 is a partial sectional view of a second exemplary embodiment of the heating element according to the present invention.

FIG. 2 shows a second exemplary embodiment of the heating element according to the present invention, in which, the heating strip is implemented in one piece but and in contrast to the exemplary embodiment shown in FIG. 1, the support 3 leads through the windings of the heating strip 1, approximately in the middle of the windings.

Figure 3:
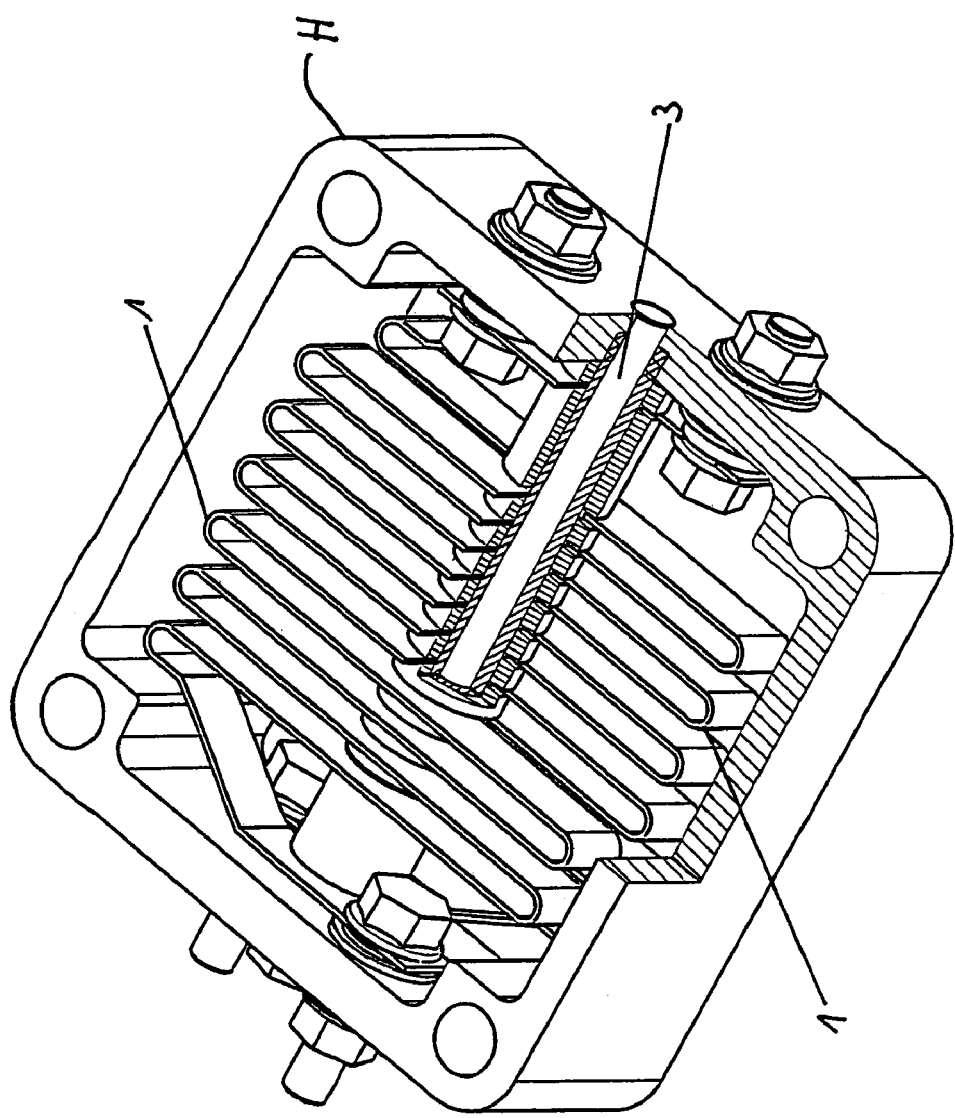
FIG. 3 is a partial sectional view of a third exemplary embodiment of the heating element according to the present invention having two heating strips.

The exemplary embodiment shown in FIG. 3 comprises two heating strips 1 lying next to one another in parallel planes, the support 3 leading through the windings of both heating strips 1 in that they are set off such that only a central support 3 is necessary for mounting.

What is claimed is:

1. A heating element for preheating the intake air for an internal combustion engine, comprising:
   a housing for attaching the heating element to an air intake line of the internal combustion engine,
   at least one heating strip running in windings, the at least one heating strip being held in the housing and is provided with electrical terminals that lead from the housing to the outside, and
   a support running from one housing wall, crosswise through the windings of the at least one heating strip to another housing, the support being electrically insulated from the heating strip.

2. The heating element according to claim 1, wherein spacers made of an electrically insulating material are provided on the support between individual windings of the at least one heating strip.

3. The heating element according to claim 2, wherein the spacers are sleeve-shaped.

4. The heating element according to claim 1, wherein the support is made of an electrical insulating material.

5. The heating element according to claim 1, wherein the support is provided with an electrical insulating coating.

6. The heating element according to claims 1, wherein an insulating tube is provided on the support.

7. The heating element according to claim 3, wherein the sleeve-shaped spacers are provided with an axial extension or lug which engages in recesses in the windings of the heating strip.

8. The heating element according to claim 7, wherein the axial extension or lug of one spacer engages in an adjacent spacer.

9. The heating element according to claim 1, wherein the at least one heating strip comprises two heating strips, wherein the two heating strips are positioned next to one another in parallel planes, and wherein a single support leads centrally trough both heating strips.

10. The heating element according to claim 9, wherein the windings are serpentine shaped.

11. The heating element according to claim 7, wherein the windings are serpentine shaped.

12. The heating element according to claim 1, wherein the windings are serpentine shaped.

13. The heating element according to claim 12, wherein spacers made of an electrically insulating material are provided on the support between individual windings of the at least one hearing strip; and wherein the support is a support rod that passes crosswise through the winding, passing from one individual winding, through an insulating spacer to another winding.

14. The heating element according to claim 1, wherein the support is a support rod.

* * * * *